UNITED STATES PATENT OFFICE.

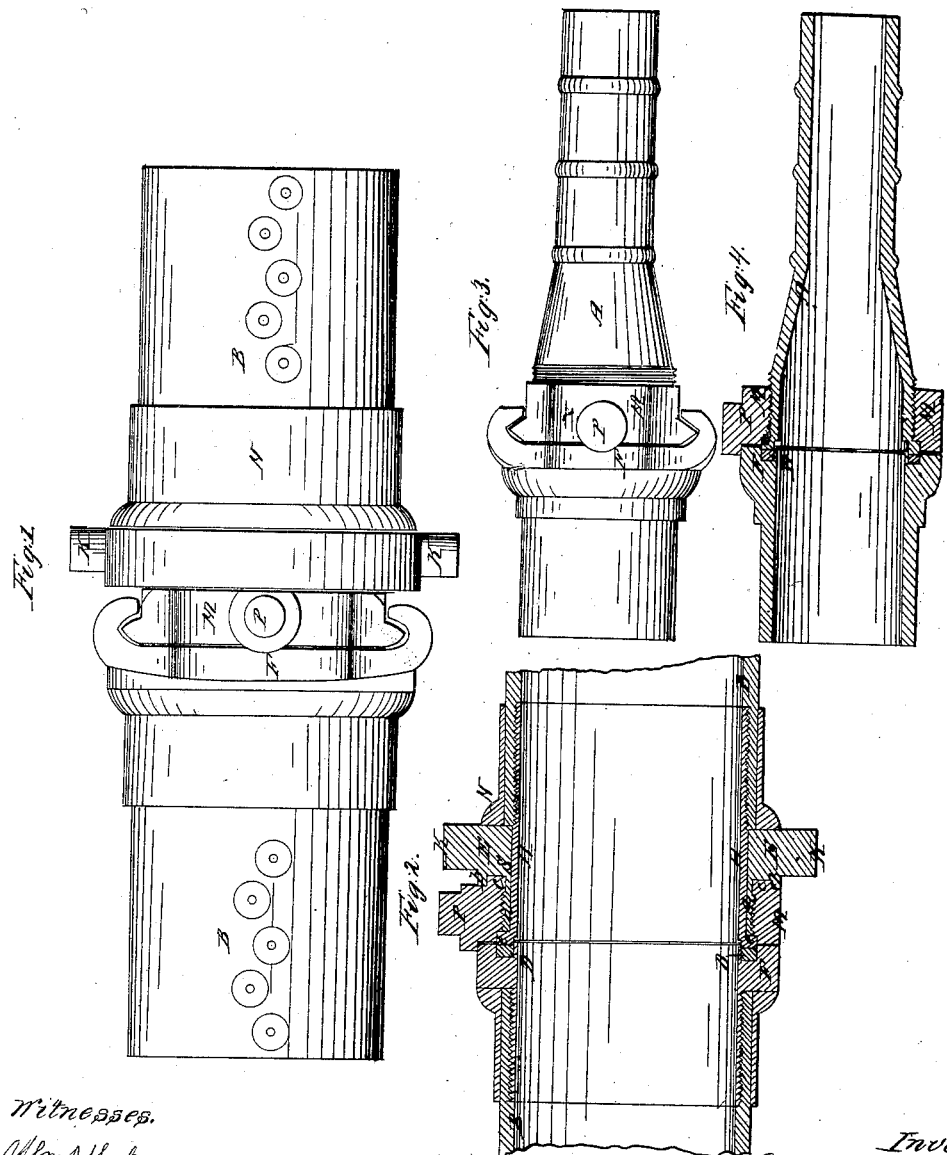
Button & Blake,
Hose Coupling,
Nº 26,749. Patented Jan. 10, 1860.

LYSANDER BUTTON AND ROBERT BLAKE, OF WATERFORD, NEW YORK.

HOSE-COUPLING.

Specification of Letters Patent No. 26,749, dated January 10, 1860.

*To all whom it may concern:*

Be it known that we, LYSANDER BUTTON and ROBERT BLAKE, of Waterford, in the county of Saratoga and State of New York, have invented an Improvement on the Side-Slide Coupling for which Letters Patent were granted to R. J. Falconer June 7, 1853, and that the following is a full, clear, and exact description of the principle or character which distinguishes it from all other things before known and of the usual manner of making, modifying, and using the same, reference being had to the accompanying drawings, of which—

Figure 1 is an elevation of the coupling joint completed; Fig. 2, a section of the same through the center of the boss P; Fig. 3, an elevation of the coupling applied to the attachment of a nozzle; Fig. 4, a longitudinal middle section of the same.

Our invention consists in an improvement upon the side-slide coupling for hose, and other pipes for which Letters Patent were granted to R. J. Falconer on the 7th day of June 1853, described and represented as follows.

We make the male and female parts of the coupling similar to those of the Falconer coupling except we do not make them to draw or tighten by means of the wedge like form or tapering of those parts. We make them to enter freely and set up or tighten the joint after the two parts are matched so as to bring their centers exactly opposite. This we effect as follows.

A is the pipe to which the hose B is attached. This pipe which we call the closing pipe passes through the male part M of the coupling and when the parts of the coupling are entered and matched, this pipe is forced up endwise so that its end presses upon the washer D making a perfectly tight joint. There is a boss P on the male part which projects over its edge so as to strike the female part when they are put together and thus insure a perfect matching of the two parts.

The swivel collar E is made with a solid portion S and two cylindrical flanges *a, b*. The flange *b* is short and covers the neck *c* of the male part M. The longer flange *a*, has a screw thread cut upon its outside which takes into a thread cut upon the inside of the male part M. The end of this flange presses against a rim or flange *e*, on the end of the hose pipe A and forces the rim *e* against the washer in the female part F and thus secures a tight joint. The swivel collar is provided with studs K to assist in turning it in screwing and unscrewing. The washer is sunk in a groove turned in the part F and the flange *e* or end of pipe A entering the groove to a slight depth serves to keep the parts F and M in place. When the collar is turned back or unscrewed it acts against the end of the ferrule or collar N and withdraws the end of pipe A from the groove and allows the parts F and M to be separated. The hose is secured upon the pipe A by the screw thread upon the outside of this pipe and the binding or pressure of the collar N.

Figs. 1 and 2 represent the joint as set up for use. Fig. 4 shows the application of the same principle to the fastening of a nozzle to a pipe.

M and F are the male and female parts of the coupling; A, the nozzle, upon the end of which is a screw thread taking into a thread upon the inside of part M and the joint is set up simply by turning the nozzle. This coupling joint combines with all the advantages of the Falconer side-slide coupling, the additional advantages of a tighter joint and one in which the two parts will always match and preserve an unobstructed passage for water.

It is obvious that the pipe A may be forced against the washer by other equivalent mechanical means without altering the essential character of the invention, which consists chiefly in completing the joint by the endwise motion of the pipe A whether said motion be caused by the swivel collar, by the turning of the pipe itself, or by the action of screws, wedges or any other mechanical means.

Therefore what we claim as our invention and improvement upon the Falconer side-slide coupling is—

Combining with the male and female parts M and F, a closing pipe having an endwise motion through one of said parts substantially as set forth.

LYSANDER BUTTON.
ROBERT BLAKE.

Witnesses:
WM. A. WALDRON,
E. BUTTON.